United States Patent
Kuklinski et al.

(10) Patent No.: US 6,766,745 B1
(45) Date of Patent: Jul. 27, 2004

(54) LOW COST RAPID MINE CLEARANCE SYSTEM

(75) Inventors: Robert Kuklinski, Portsmouth, RI (US); Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/267,887

(22) Filed: Oct. 8, 2002

(51) Int. Cl.[7] .................................................. B63G 9/00
(52) U.S. Cl. ....................... 102/402; 102/406; 89/1.13
(58) Field of Search ............................... 102/402, 406; 89/1.13

(56) References Cited

U.S. PATENT DOCUMENTS

| | | | | |
|---|---|---|---|---|
| 2,396,699 A | * | 3/1946 | Hayes et al. | 200/61.01 |
| 3,016,829 A | * | 1/1962 | Hall | 102/418 |
| 3,790,927 A | * | 2/1974 | Chwastyk | 367/133 |
| 3,922,635 A | * | 11/1975 | Colvin et al. | 367/126 |
| 4,938,136 A | * | 7/1990 | Gould | 102/406 |
| 5,598,152 A | * | 1/1997 | Scarzello et al. | 340/850 |
| 5,708,230 A | * | 1/1998 | Woodall et al. | 102/402 |
| 5,844,159 A | * | 12/1998 | Posseme et al. | 89/1.13 |
| 6,055,214 A | * | 4/2000 | Wilk | 367/99 |
| 6,286,431 B1 | * | 9/2001 | Cangelosi | 102/402 |
| 6,634,273 B2 | * | 10/2003 | Cangelosi | 89/1.13 |

* cited by examiner

Primary Examiner—Charles T. Jordan
Assistant Examiner—T. Nguyen
(74) Attorney, Agent, or Firm—James M. Kasischke; Michael F. Oglo; Jean-Paul A. Nasser

(57) ABSTRACT

A method and apparatus to clear mines uses tag particles dropped into ambient water across a wide area by an aircraft to sink and stick to submerged mines. The tag particles each contain a gas volume dimensioned to resonate with impinging acoustic energy and reflect portions of the impinging acoustic energy from a targeted mine. An unmanned underwater vehicle platform having a sonar system provided with at least one transducer projects the acoustic energy through the ambient water. At least one hydrophone transducer in the sonar system receives the reflected portions of the projected acoustic energy to locate a targeted mine to enable its destruction by high-energy supercavitating projectiles fired from the platform. Tag particles dissolve after a period of time to provide virtually no discernable traces of a mine hunting operation.

5 Claims, 4 Drawing Sheets

FIG. 2

LOW COST RAPID MINE CLEARANCE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to a method and system to clear mines underwater. More particularly, this invention relates to dropping tag particles across an area of the ocean and deploying an unmanned underwater vehicle to locate and neutralize mines that have a number of tag particles on them.

(2) Description of the Prior Art

Clearing underwater mines is a complicated, costly endeavor. The per-mine-killed cost of a robust system is often much greater than the cost of each mine. This unbalance is unacceptable since mass produced underwater mines could limit a navy's ability to operate in vast near-shore areas. The state of the art in mine clearance has relied on using sophisticated unmanned underwater vehicles (UUVs) each having a single warhead. The state of the art UUV locates an underwater mine, maneuvers in close proximity to it, and detonates the warhead. The underwater explosion is successful in the neutralization of a single mine if the UUV is positioned correctly. However, there are several shortcomings to this state of the art approach. The use of an underwater explosion precludes any element of stealth in the clearance of a single mine. This can be a major tactical shortcoming of the current methodology. Another is that the effectiveness of this technique relies on very accurate placement of the detonating charge to at least close proximity to the mine. Consequently, attaining this proximity comes at the considerable cost of a complex targeting system, complex vehicle control systems, and a complex vehicle to house such systems.

Furthermore, the contemporary UUV is often guided by communication links to a surface or underwater platform and requires significant involvement of crew resources to manage the launching, targeting and recovery of the UUV. The time to clear a well-mined area can be excessive and during the mine clearing operation, the naval assets managing and in support of the task may be easily targeted. The fact that simple floating mines may be mass-produced a very low cost produces yet another severe obstacle for an expensive system that can clear only a single mine. The problems associated with targeting mines in shallow water are also a concern, for examples, poor acoustics and water clarity limit traditional targeting systems.

In addition to the existing systems that incorporate at least one UUV in some navies, other devices such as that disclosed in U.S. Pat. No. 6,032,567 have been documented. In an operational sense they too have similar shortcomings regarding targeting and destruction of underwater mines. An additional problem these devices share is their limited effectiveness due to rapid dissipation of explosions or projectiles in an underwater environment.

Thus, in accordance with this inventive concept, a need has been recognized in the state of the art for a method and apparatus to tag, locate, identify, and neutralize mines.

SUMMARY OF THE INVENTION

The first object of the invention is to provide a means to identify underwater mines.

Another object is to provide a method and apparatus to position a vehicle in proximity to an underwater mine.

Another object is to provide a method and apparatus to target an underwater mine.

Another object is to provide means to target an underwater mine in an unfavorable acoustic or visual environment.

Another object is to provide a robust means to destroy underwater mines.

Another object of the invention is to provide a system having the capability to neutralize several underwater mines with a single system during a single mission.

Another object of the invention is to provide a method and apparatus to tag and target mines quickly over a wide area.

Another object is to provide a method and apparatus to tag a plurality of mines from a single airborne platform.

Another object is to provide a method and apparatus to tag mines in a covert fashion.

Another object is to provide a method and apparatus is to tag mines for a finite duration of time.

Another object of the invention is to provide a method and apparatus to quickly identify tagged underwater mines.

Another object of the invention is to provide a method and apparatus for the rapid destruction of tagged mines.

Another object is to provide a method and apparatus to destroy a number of mines in a covert fashion by a single UUV platform.

Another object is to provide a cost effective means to destroy mines from long range.

Another object of the invention is to provide a mine clearance platform that may operate in its own self-defense.

Another object of the invention is to provide a method and apparatus to destroy underwater mines located at different depths in the water.

Another object is to provide a mine clearance system that may operate autonomously or with operator control.

Another object is to provide means to identify more mines than existing systems do.

These and other objects of the invention will become more readily apparent from the ensuing specification when taken in conjunction with the appended claims.

Accordingly, the present invention is a method and apparatus to clear mines underwater. Tag particles are dropped from an aircraft over a wide area of the ocean to sink and stick on submerged mines. An unmanned underwater vehicle (UUV) platform locates and neutralizes mines that have tag particles on them. The platform has an elongate cylindrical-shaped pressure hull that could be launched from a torpedo tube, for example. The tag particles each contain a gas volume dimensioned to resonate with impinging acoustic energy and create reflected portions of the impinging acoustic energy from a targeted mine. The UUV platform has a sonar system provided with at least one transducer to project the acoustic energy through the ambient water. At least one hydrophone transducer in the sonar system receives the reflected portions of the projected acoustic energy to locate a targeted mine to enable its destruction by high-energy supercavitating projectiles fired from the UUV platform. All tag particles dissolve after a period of time to provide no discernable traces of a mine hunting operation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein:

FIG. 2 is a schematic view showing details of the UUV;

DESCRIPTION OF THE PREFERRED EMBODIMENTS

Figure 1:
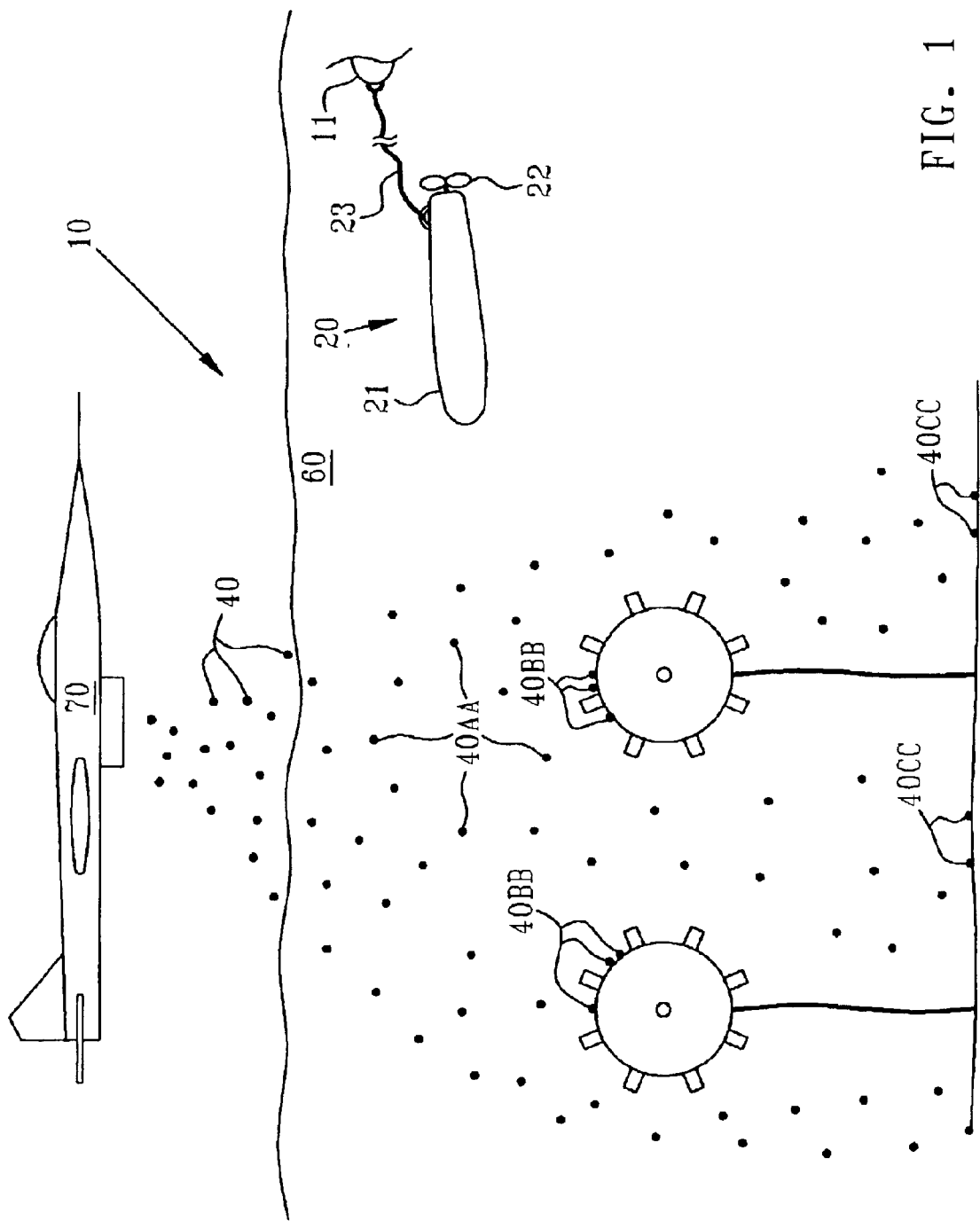
FIG. 1 is a schematic view of the mine clearance system of this invention.
Figure 2:
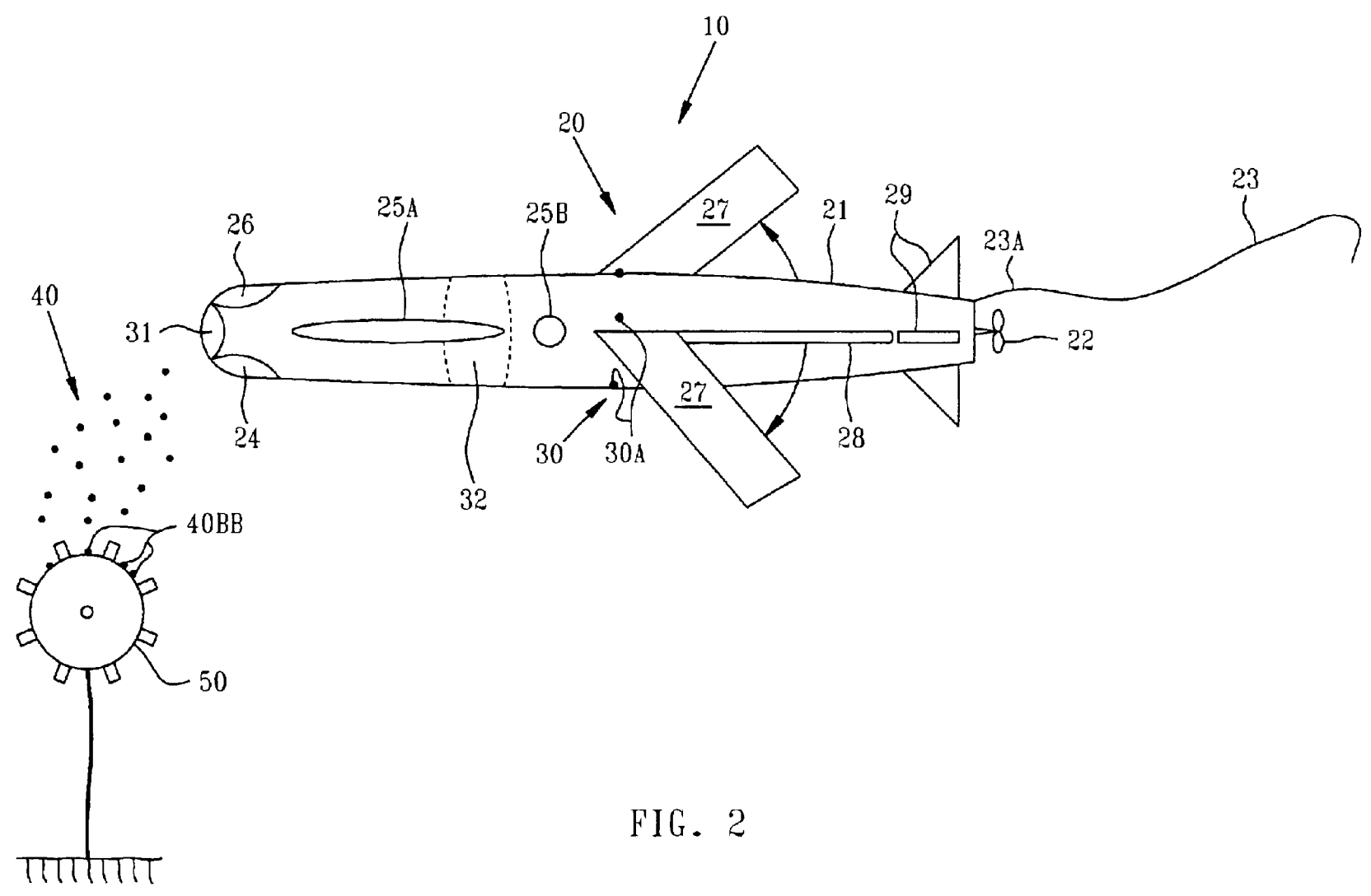

Referring to FIGS. 1 and 2 of the drawings, mine clearance system 10 has an unmanned underwater vehicle (UUV) platform 20 deployed from a remote site 11. UUV platform 20 operates in concert with tag particles 40 to neutralize targets, such as a mine 50 or field of mines beneath the surface of water 60. Mines typically are buoyant and are held in place by a tether 50A. UUV platform 20 and tag particles 40 of mine clearance system 10 synergistically cooperate to improve kill ratios of mines 50 as compared to more costly, contemporary systems.

FIG. 1 shows an aircraft 70 dropping of tag particles 40 and UUV platform 20 positioned in water 60. It is to be understood, however, that tag particles 40 of this invention are more likely to be dropped from or sown by aircraft 70 across a wide area, or region suspected of being mined prior to deployment of UUV platform 20. Aircraft 70 may be a conventional fixed wing aircraft, drone aircraft, or helicopters. Surface vessels may be used to disperse tag particles 40. Some particle disbursement methods may be more desirable than others for avoiding unwanted attention.

UUV platform 20 can have an elongate cylindrical-shaped pressure hull 21 enabling its launch from a tube, such as a torpedo tube at remote site 11. Hull 21 is made from metal or synthetic materials having sufficient strength for bearing ambient water pressure. Other components to be described herein also are substantially built and sealed to reduce the effects of ambient water pressure, and these components and interconnections are made according to acceptable and established marine engineering principles for successful operation while UUV platform 20 hunts and destroys mines 50 at depths.

At least one propeller 22 can be located aft on hull 21 and is connected to an appropriate motor and power supply (not shown) to propel UUV platform 20. The power supply can additionally be used to power communication, sensor, processing, and activation modules in UUV platform 20. An optical fiber 23 can be deployed from a spool of such fiber in hull 21 to extend from an extension 23A of UUV platform 20 to remote site 11. Optical fiber 23 will function as an optical communication link. This link will transmit control signals to UUV platform 20 from remote site 11 and data signals from UUV platform 20 to remote site 11.

Figure 4:
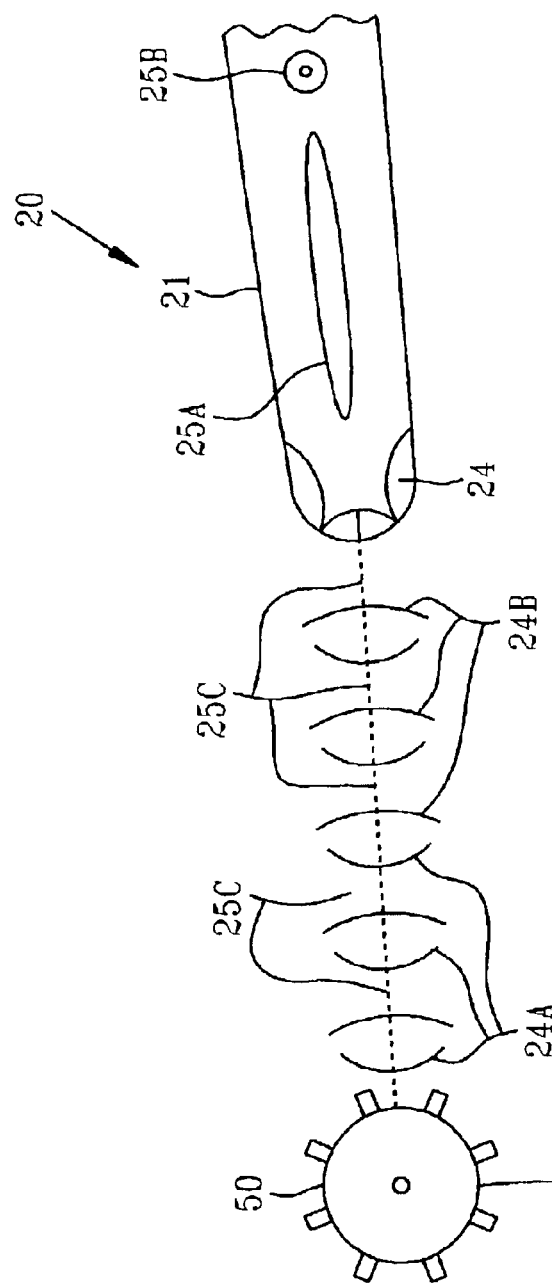
FIG. 4 schematically depicts the UUV platform engaging a tagged mine.

UUV platform 20 has modular systems on board to assure responsive buoyancy and propulsion, auto pilot and guidance including optical, acoustic and other navigation systems as well as Global Positioning System (GPS) compatible systems. Such systems are well established in the art and can be selected and tailored for incorporation into UUV platform 20 by one skilled in the art. UUV platform 20 additionally has an acoustic sensor system, or sonar system 24 schematically depicted as being located near the nose portion of UUV platform 20. As shown in FIG. 4, this system has at least one acoustic transducer to project acoustic energy 24A through ambient water 60 and at least one acoustic transducer (hydrophone) to receive reflected portions 24B of the projected acoustic energy from mines 50. Acoustic energy 24A can be projected in response to control signals sent over optical fiber 23 from remote site 11, and the information concerning the reflected acoustic energy 24B can be transmitted over optical fiber 23 to site 11.

The acoustic transducers project and receive acoustic energy at high frequencies to provide meaningful imaging from reflected acoustic energy from the tag particles on the mines 50 to identify the mines. The high frequencies of the projected and reflected acoustic energy 24A and 24B may typically be in the range, for example, from between 100 KHZ and 2 MHZ for acceptable resolution. These typical frequencies of sonar system 24, are intended to be exemplary and not intended to be limiting, and this energy is used to detect tag particles 40 as explained below.

UUV platform 20 has two underwater projectile systems 25A and 25B. Projectile systems 25A and 25B fire supercavitating projectiles 25C (FIG. 4). Supercavitating projectiles 25C may be bullet-like missiles propelled from conventional cartridges by detonating propellants or may be rocket-like projectiles propelled by exhaust gases produced from burning rocket propellants from launch rack-like structure in UUV platform 20. In either case, projectiles 25C are designed to be supercavitating assuring sufficiently high velocity passage through the water and sufficient kinetic energy to destroy or otherwise neutralize a targeted mine 50.

Projectile system 25A is oriented to shoot supercavitating projectiles 25C into its targeted mine 50 when the designated mine 50 is directly in front of, or aligned with the longitudinal axis of UUV platform 20. Projectile system 25B is oriented to shoot supercavitating projectiles 25C into its targeted mine 50 when the designated mine 50 is at right angles to the longitudinal axis of UUV platform 20. Projectile systems 25A and 25B may have magazines of supercavitating projectiles 25C fired from firearm-like cartridges or launched from stacked rocket launching racks so that systems 25A and 25B are therefore, capable of firing multiple rounds in bursts or as single shots. Bursts of supercavitating projectiles, such as shown in FIG. 4 might be used to facilitate the destruction of not only mines 50 but also moving targets, such as a threatening hostile undersea craft or incoming missiles. In addition, firing bursts of projectiles 25C from projectile systems 25A and 25B may help reduce the necessity of having an elegant targeting solution.

A flash-suppressing muzzle can be provided for projectile systems 25A and 25B to reduce the possibility of detection of their firing. Projectile systems 25A and 25B can also have laser-targeting systems (not shown) that may include a laser designator aligned with projectile systems 25A and/or 25B to illuminate a target. In addition laser-targeting systems for systems 25A and 25B could be responsive to laser designation from another UUV platform that has a laser designator to kill an illuminated mine 50.

UUV platform 20 may additionally be provided with a magnetic detection and fuzing device 26 that can use magnetic sensing and homing to detect mine 50 and aim and align underwater projectile systems 25A and 25B for destruction of the targeted mine 50. Device 26 might additionally be used to identify and home in on threatening countermeasures or hidden magnetic objects that otherwise might not be discovered.

UUV platform 20 is stabilized for steering, station keeping, and accurate firing of supercavitating projectiles 25C from projectile systems 25A and 25B by pop-out wings 27 and control surfaces 29. Pop-out wings 27 are pivotally rotated from slot-shaped bays 28 in UUV platform 20. Fore, or aft fin-like control surfaces 29 are outwardly displaced from UUV platform 20 to a fixed position after launch from the tube at remote site 11. Wings 27 and control surfaces 29 may be selectably rotated by suitable mechanisms responsive to control signals for steering and maintaining the attitude of UUV platform during transit to mine 50 and/or during firing of projectiles 25C. Wings 27 and control surfaces 28 may also have controllable flaps to further refine control.

Maneuvering and stabilizing UUV platform 20, particularly during firing, can further be augmented by a vectored thrust control system 30. Vectored thrust control system 30 has a number of radially outwardly pointing nozzles 30a that direct selective high pressure flows of fluid outwardly to hold UUV platform 20 steady and allow firing of projectiles 25C at targeted mines 50, or other targets, at any orientation.

An underwater camera system 31 is used to assist transit to the targeted mines and to assist in the final targeting of mines 50. Camera system 31 is mounted forward on UUV platform 20 and may have a source of visible or non-visible radiation, depending on the type of camera used. During progression to a targeted mine 50, the radiation source can radiate energy on not only the area in front of UUV platform 20 but also marine topography at the bottom of ambient water 60. The high level of radiation enables a sensor package, e.g., camera, radiation detector, etc., in camera system 31 to receive reflected portions of the radiation and provide data signals representative of ambient features and mines 50. These data signals are processed in processing, logic, and relay modules in UUV platform 20 and relayed remote site 11. UUV platform 20, therefore, has another capability for avoiding obstacles, following a series of known undersea features and/or locating and identifying mine 50. Because UUV platform 20 may be submerged to a considerable depth in water 60, the radiation associated with camera system 31 is hidden from possibly unfriendly observers above water 60 as data is gathered.

A conventional warhead 32 can be included in UUV platform 20 to destroy a high value target or hardened target. Warhead 32 might also be detonated to destroy or scuttle UUV platform 20 when such action is desired.

Responsive displacements of propeller 22, wings 27 control surfaces 28 and vectored control system 30 via modules in UUV platform 20 steer and guide UUV platform 20 to the vicinity of one or more mines 50. The processing and logic modules for accomplishing this are well known in the art and are included in UUV platform 20 where they process incoming data signals from sonar system 24 and camera system 31. Furthermore, the processing, logic and transceiver modules in UUV platform 20 are also responsive to command signals received from remote site 11 over optical fiber 23. These modules can be responsive to acoustic command signals received through ambient water 60 from remote site 11 by the hydrophone transducers of sonar system 24. Accordingly, these modules create internal control signals for maneuvering UUV platform 20 in response to data signals and the remotely originating command signals thereby steering and guideing UUV platform 20 to mine 50. Thus, UUV platform may be deployed at remote site 11 and may travel a distance of several nautical miles underwater under the control of command signals from remote site 11. Once near mine 50, UUV platform 20 may rely on data signals from sonar system 24, magnetic system 26, and camera system 31 to acquire, identify, and home in on one or more mines 50 and destroy them by projectile systems 25A and 25B.

Figure 3C:
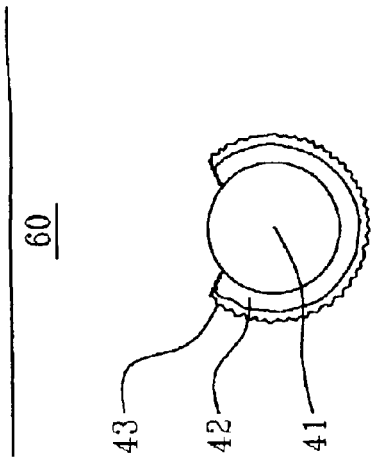
FIG. 3C schematically shows a tag particle after a time past time t=0 upon dissolution of a water soluble acoustically transparent cover and adhesive.
Figure 3B:
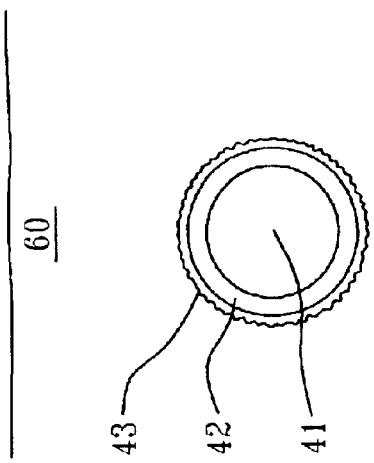
FIG. 3B schematically shows a tag particle when it is wetted at a time t=0 as it is dropped into water.
Figure 3A:
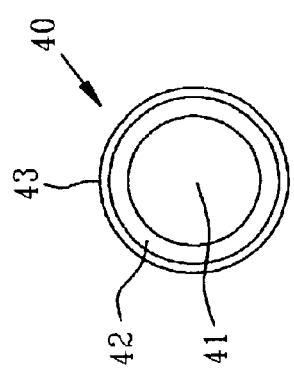
FIG. 3A schematically shows a tag particle while it is dry before deployment in water.

Mine clearance system 10 of this invention has tag particles 40 to aid in locating, identifying, and destroying mines 50. Referring to FIGS. 3A, 3B, and 3C, each tag particle 40 has a virtually uniformly sized volume of gas 41 contained inside a water-soluble acoustically transparent cover 42 that is at least partially coated by a water-activated adhesive 43. Each acoustically transparent cover 42 allows interaction between impinging acoustic energy from projector-transducers of sonar system 24 and each gas volume 41. The uniform size of gas volumes 42 and the relatively great acoustic impedance between the gas and the surrounding water will make each tag particle 40 resonate, or appear to radiate as a dominant acoustic source as compared to the ambient. This resonance, or apparent radiation will be created when each tag particle 40 is exposed to projected acoustic energy from transducers 24 at the particle's resonant frequency. The resonant frequency is a function of the dimensions of the gas volume 41 in the particle 40. Optionally, the projected acoustic energy could come from another source, such as remote site, for example. Consequently, each mine 50 that has tag particles 40 on it will become more acoustically enhanced, or prominent in the projected acoustic energy from sonar system 24. This will enable location of tagged mines 50 at greater distances than untagged mines 50.

Referring also to FIG. 3A, when tag particles 40 are being stored or transported while they are in the dry state, or dry, the outer water-activated adhesive 43 is inert preventing coalescence of tag particles 40. Accordingly, tag particles 40 can be stored in mass quantities on board aircraft 70 and freely sown or dropped to disperse over a wide area or region where mines 50 are suspected of being located. The combined weight of gas volume 41, cover 42, and adhesive 43 of each tag particle 40 is such as to make tag particles 40 be negatively buoyant and sink when they are in water.

Referring also to FIG. 3B, when adhesive 43 of each tag particle 40 contacts water 60 at a time, t=0, it is wetted and becomes activated (sticky). The outer, wetted surfaces of adhesive 43 become sticky enough to adhere to the outer surfaces of mines 50. The gas volume 41 can be air, nitrogen or any type of relatively non-reactive gas having low moisture content. Cover 42 can be gelatin or some other acoustically transparent water-soluble material. Adhesive 43 can be any well-known water activated adhesive.

Referring also to FIG. 3C, after a period of time in water 60 beyond t=0, adhesive 43 dissolves, and water-soluble cover 42 dissolves. The dissolving of adhesive 43 and cover 42 of each tag particle 40 frees gas volume 41 to the water where it may escape. Consequently, there are virtually no readily discernable traces of tag particles 40 left for detection of the tagging process. Selection among well-known materials for and tailoring of cover 42 and adhesive 43 by one skilled in the art can change the rates of activation and dissolution.

Referring also to FIG. 1, aircraft 70 carrying dry tag particles 40 flies over a suspected minefield and drops tag particles 40 across a wide area of water 60. Since tag particles 40 are heavier than water 60, they sink in water 60 as tag particles 40, designated 40AA. Water 60 activates adhesives 43 on cover 42 causing particles 40AA to become sticky. A small number of tag particles 40, designated 40BB, are stuck on the outer surfaces of mines 50. The remainder of tag particles 40 settle on the bottom of water 60 and are designated 40Cc. UUV platform 20 searches for reflected acoustic energy from mines 50, those mines 50 that are tagged with adhered tag particles 40 (40BB) can be detected and UUV platform 20 can home in on them. Tag particles 40 (40CC) at the bottom are not detected, and after a period of time, they will dissolve sufficiently to each release gas volume 41 which is buoyed to the surface of water 60.

Referring to FIG. 4, UUV platform 20 detects a tagged mine with projected and reflected acoustic energy at enhanced ranges for subsequent visual identification by camera system 31. Tag particles 40BB of mine hunting system 10 that are adhered to mines 50 make the job of finding them by UUV platform 20 easier and at a greater distance as compared to contemporary systems. After location and identification, each mine 50 can be methodically destroyed by UUV platform 20 which aims and fires one or more aimed high-kinetic energy supercavitating projectiles 25C. The aimed high-energy supercavitating projectiles 25C from projectile systems 25A and 25B are fired, or launched from UUV platform 20 that is located at a safe separation distance from each mine 50. The use of a supercavitating projectile 25C greatly extends the offset, or separation distance at which it will penetrate each mine 50. The penetration of each mine 50 underwater with high kinetic energy supercavitating projectile 25C completes the neutralization of each mine 50, and the safe separation distance reduces the possibility of damaging UUV platform 20 so that it can find and destroy a number of mines during a single deployment.

Mine clearance system 10 of the invention uses supercavitating projectiles 25C fired from underwater projectile system 25A and 25B on UUV platform 20 to destroy mines 50 underwater. Mine clearance system 10 also can use its supercavitating projectiles 25C from projectile systems 25A and 25B for self-defense. Mine clearance system 10 has the ability to place tag particles 40 on mines 50 across a wide area or region via one or more aircraft 70 and deploy more than one UUV platform 20 to simultaneously clear mines 50 from an area.

Mine clearance system 10 uses tag particles 40 designed to "tag" underwater mines 50 and then dissolve and dissipate their gas volumes to limit their lifetime. Mine clearance system 10 uses identifying tag particles 40 to locate mines by acoustic means by its sonar system 24, and optionally may use magnetic device 26 and/or camera system 30.

Mine clearance system 10 of this invention provides for (1) less cost per mine destroyed, and (2) destruction of a large number of mines per mission as compared to contemporary mine neutralization systems. Mine clearance system 10 additionally has the ability to: (1) target and locate more mines per mission, (2) target mines quicker, (3) destroy mines in more adverse environmental conditions, (4) destroy mines from greater distances, (5) destroy mines undetected, (6) destroy mines located over a wider range of depths, and (7) destroy mobile mines as compared to contemporary mine neutralization systems.

The disclosed components and their arrangements as disclosed herein all contribute to the novel features of this invention. Mine clearance system 10 of this invention provides a reliable and cost-effective means to remove the threat that may otherwise be created by underwater mines. Therefore, mine clearance system 10 as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A mine clearance system comprising:

an underwater vehicle having at least one transducer for projecting acoustic energy through ambient water and at least one hydrophone for receiving reflected portions of said projected acoustic energy; and a plurality of tag particles capable of adhering to underwater structures, positionable in said ambient water and passively resonating with said projected acoustic energy and thereby reflecting portions of said projected acoustic energy.

2. The system of claim 1 wherein said plurality of tag particles have a cost and simplicity allowing deployment of a multiplicity thereof.

3. The system of claim 1 wherein each of said tag particles comprises:

an acoustically transparent shell;

a gas volume contained in said acoustically transparent shell, said gas volume chosen for resonating at the frequency of said projected acoustic energy; and an adhesive positioned on the surface of said acoustically transparent shell for adhering with underwater structures.

4. The system of claim 3 wherein said adhesive is activated by contact with ambient water.

5. The system of claim 3 wherein said acoustically transparent shell is water soluble and dissolves over a period of time.

\* \* \* \* \*